United States Patent [19]

Kalinichenko

[11] 4,200,825
[45] Apr. 29, 1980

[54] DIGITAL CONTROL DEVICE FOR THYRISTOL-PULSE D.C. REGULATORS

[75] Inventor: Anatoly Y. Kalinichenko, Moscow, U.S.S.R.

[73] Assignee: Vsesojuzny Nauchno-Issledovatelsky Institut Vagonostroenia, Moscow, U.S.S.R.

[21] Appl. No.: 889,543

[22] Filed: Mar. 23, 1978

[51] Int. Cl.² ............................................. G05B 5/00
[52] U.S. Cl. .................................... 318/312; 318/375
[58] Field of Search ................ 318/375, 376, 310–312, 318/329, 341, 415, 603

[56] References Cited

U.S. PATENT DOCUMENTS

| | | | |
|---|---|---|---|
| 3,737,751 | 6/1973 | Lima ..................................... | 318/375 |
| 3,838,325 | 9/1974 | Kobayashi et al. ............... | 318/341 X |
| 4,123,693 | 10/1978 | Anderson et al. ................ | 318/376 |
| 4,152,631 | 5/1979 | Weinberg et al. ................ | 318/341 X |

OTHER PUBLICATIONS

"DC Motor Velocity Control Using Digital Error Decode", IBM Technical Disclosure Bulletin, vol. 13, No. 9, Feb. 1971, pp. 2744–2746.

Primary Examiner—Gene Z. Rubinson
Assistant Examiner—W. E. Duncanson, Jr.
Attorney, Agent, or Firm—Lackenbach, Lilling & Siegel

[57] ABSTRACT

Disclosure is made of a digital control device intended to control thyristor-pulse d.c. regulators and comprising a master oscillator whose output is connected to an input of a clock pulse counter. A multidigit logic output of the clock pulse counter is connected to two control channels, each comprising in series a matching decoder, a reversible counter, a distributor, a comparator, a digital-analog converter, a coder, and a control decoder. Multidigit inputs of the control decoders of each control channels are connected to a multidigit output of a binary counter. The binary counter has its single-digit input and its multidigit input connected to an output of a pulser and multidigit output of a control unit, respectively. An input of the control unit is connected to a velocity transducer, and its reset output is connected to reset inputs of the master oscillator, a clock pulse generator, the clock pulse counter, the reversible counters, the pulser, and a voltage transducer. Reference signal inputs and clock inputs of both comparators are connected to an output of the voltage transducer and an output of the clock pulse generator, respectively.

1 Claim, 2 Drawing Figures

DIGITAL CONTROL DEVICE FOR THYRISTOL-PULSE D.C. REGULATORS

FIELD OF THE INVENTION

The present invention relates to automatic control systems and, more particularly, to digital control devices intended to control thyristor-pulse d.c. regulators.

The device of this invention can be used, for example, in commercial electric drives or traction motors of electric rolling stock, in which case its purpose is to control the braking force in the course of electric braking.

DESCRIPTION OF THE INVENTION

There is known a device for controlling thyristor-pulse regulators (cf. the Transactions of the Dnepropetrovsk Railway Engineers' Institute, 1972, Series 135, pp. 110-120), which comprises a master oscillator connected to a counter of clock pulses arriving from the master oscillator. A multidigit logic output of the clock pulse counter is connected to a multidigit logic input of each of two decoders. Multidigit information inputs of each of the two decoders are connected to one of two reversible counters. Each of the reversible counters has an add input and a subtract input intended to receive control signals from a control unit. Reset inputs of the master oscillator, the reversible counters and the clock pulse counter are connected to a reset output of the control unit.

The device under review operates as follows. The master oscillator continuously applies clock pulses to the input of the clock pulse counter, whereby the state of the clock pulse counter's flip-flops is changed. From "1" and "0" outputs of the flip-flops of the clock pulse counter, signals are applied to 2n digit locations of the multidigit logical inputs of each decoder (n being the digit capacity of the clock pulse counter). At the initial stage of the control, from the outputs of one of the reversible counters to the multidigit information input of one of the decoders there are applied pulses which form a binary code combination corresponding to the states of the "n" flip-flops of this reversible counter. The binary code combination stored in the reversible counter is determined by the number of control signals applied to the add input of this reversible counter.

From one of the outputs of the high-order digit of the flip-flop of the clock pulse counter, i.e. from its control output, to the main thyristor of a thyristor-pulse regulator there are applied pulses which are fixed in time and arrive with a frequency:

$$f = F_n/2 \qquad (1),$$

where F is the repetition frequency of clock pulses arriving from the output of the master oscillator. In case of a coincidence of code combinations applied to the multidigit logic input and the information input of the decoder, at the decoder's output there are produced pulses which are shifted in time. From the output of the decoder, these pulses are applied to a switching thyristor of one of the thyristor-pulse d.c. regulators. The onset of the next pulse is shifted relative to the onset of the previous pulse by $$\delta_t = (i-j)(T/2^n) \qquad (2),$$

where T is the switching period of the main and switching thyristors of the thyristor-pulse regulator; and i and j designate the number of control signals applied to the add and subtract inputs, respectively, of the reversible counter.

Continued arrival of control signals at the add input of the reversible counter increases the difference between the instants time-fixed and time-shifted pulses are applied to the thyristors of one of the thyristor-pulse regulators; as a result, there is an increase in the duration of the output voltage pulse of the thyristor-pulse regulator. As the output voltage of this thyristor-pulse regulator reaches a rated value, the second reversible counter is brought into play, and control signals start arriving at its add input. The second reversible counter forms time-shifted pulses for another thyristor-pulse regulator.

Time-shifted pulses are produced at the output of the second decoder in case of a coincidence of the respective binary code combinations applied to its multidigital logic input and its information input. Operation of the second reversible counter is similar to that of the first reversible counter.

Thus, the device under review forms control pulses for two control channels, each comprising a reversible counter and a decoder connected to a clock pulse counter; at the outputs of the decoders there are formed pulses shifted in time, and at the control output of the clock pulse counter there is formed a train of time-shifted pulses. One of the control channels start operating at the initial stage of the control and operates until one of the thyristor-pulse regulators is brought to its rated duty; as the first thyristor-pulse regulator reaches the rated value of a parameter being regulated, the second control channel is brought into play. In many cases it is necessary to shift the moment the second control channel is to be brought into operation. Consider, for example, a traction drive unit where a single thyristor-pulse regulator is used to regulate voltage across the traction motors. After this voltage reaches a rated value, which may not be equal to the voltage value of the power source, another thyristor-pulse regulator is brought into play to adjust the attention factor of the exciting winding's field; this increases the speed of rotation of the motor and, accordingly, the speed of the train.

However, this manner of controlling thyristor-pulse regulators does not make it possible to fully utilize the installed capacity of motors and ensure their normal operation under the existing potential and switching conditions. The first limitation is related to the reactive electromotive force which is derived from the known formula:

$$p = \frac{eiN\omega^2 \lambda l v}{\beta_K(v - \frac{a}{p} + \gamma^1 + \epsilon)} \qquad (3),$$

where i is the current through the parallel branch;
N is the number of commutator bars;
w is the number of turns in a section;
$\beta_k$ is the commutator pitch;
$\gamma^1$ is the number of bars overlapped by the brush;
$\epsilon$ is the shortening of the winding in the commutator pitches; and
v is the speed of rotation.

As regards the potential conditions, the limitations are related to a maximum inter-bar voltage which is derived ffrom the known formula:

$$U_{max} = \frac{\rho_{max} \cdot K \cdot \alpha}{2p\left(1 + 0.45 \frac{N}{8\alpha pwB \cdot \beta}\right)} \quad (4),$$

where $\rho_{max} = \frac{\rho_{nom}\phi_F}{\phi_\alpha}$ is the maximum inter-bar voltage.

As pointed out above, the device under review does not provide for automatic control of thyristor-pulse regulators with due regard for the above-mentioned limitations. This is due to the fact that control signals are applied to the add and subtract inputs of the counters with a constant repetition industry and with due regard for limitations related to a maximum starting current value; this, in turn, reduces the braking force and makes the braking distance longer; as a result, the average speed of the train is reduced. (Here and elsewhere in the text of this disclosure the repetition industry is to be understood as the number of control signals arriving at the inputs of the reversible counter per unit of time). Apart from the above-mentioned factors, there is an increase in the braking time of the motor, which is because the thyristor-pulse regulators operate sequentially. In electric drives of the type that is used in industry, the use of the control device under review does not make it possible to reduce the braking time of the motor, nor does it make possible to increase the efficiency and reliability of the motor.

In order to control thyristor-pulse regulators with due regard for potential and switching limitations, it is necessary to vary the intensity of applying control signals to the reversible counters; it is also necessary to vary the sequence of sending control pulses to the add and subtract inputs. As a result, it is possible to simultaneously adjust the magnetization field attenuation factor $\beta$ $$\beta = I_\beta/I_a \quad (5),$$

where $I_\beta$ and $I_a$ are the current through the exciting winding and the armature current, respectively, and the brake resistance value $R_T$, which adjustment is done with the aid of thyristor-pulse regulators.

SUMMARY OF THE INVENTION

It is an object of the present invention to provide a digital control device to control thyristor-pulse d.c. regulators, which would be able to automatically and simultaneously control both thyristor-pulse d.c. regulators with due regard for the limitations imposed by the switching conditions and potential conditions at the electromotor's commutator.

The present invention essentially consists of a digital control device intended to control thyristor-pulse d.c. regulators and comprising a master oscillator connected to a clock pulse counter whose multidigit logic output is connected to two control channels. Each control channel comprises a matching decoder having its multidigit information input connected to an output of a reversible counter. Reset inputs of the master oscillator, the clock pulse counter and the reversible counters are connected to a reset output of a control unit. According to the invention, in each control channel the reversible counter is connected with its add and subtract inputs to a distributor whose input is connected to an output of a comparator. Each comparator has its control input connected to a digital-analog converter having its input connected to an output of a coder. Each coder has an input connected to an output of a control decoder, inputs of each control decoder being connected to an output of a binary counter. The binary counter has a multidigit input connected to a multidigit control output of the control unit, and a single-digit input connected to an output of a pulser. The output of the control unit is connected to reset inputs of a voltage transducer, the pulser, and a clock pulse generator. The output of the clock pulse generator is connected to a clock pulse input of each comparator and each comparator has its reference signal input connected to an output of the voltage transducer. An input of the control unit is connected to an output of a velocity transducer.

The device of this invention is advantageous in that it automatically controls thyristor-pulse regulators with due regard for limitations imposed by the switching conditions and potential conditions at the commutator. In the case of a traction electric motor drive, the use of the invention helps to shorten the braking path, increase the speed of the rolling stock and the reliability of electromotors.

BRIEF DESCRIPTION OF THE DRAWINGS

Other objects and advantages of the present invention will become more apparent from the following detailed description of a preferred embodiment thereof to be read in conjunction with the accompanying drawings, wherein.

DETAILED DESCRIPTION OF THE INVENTION

Figure 1:
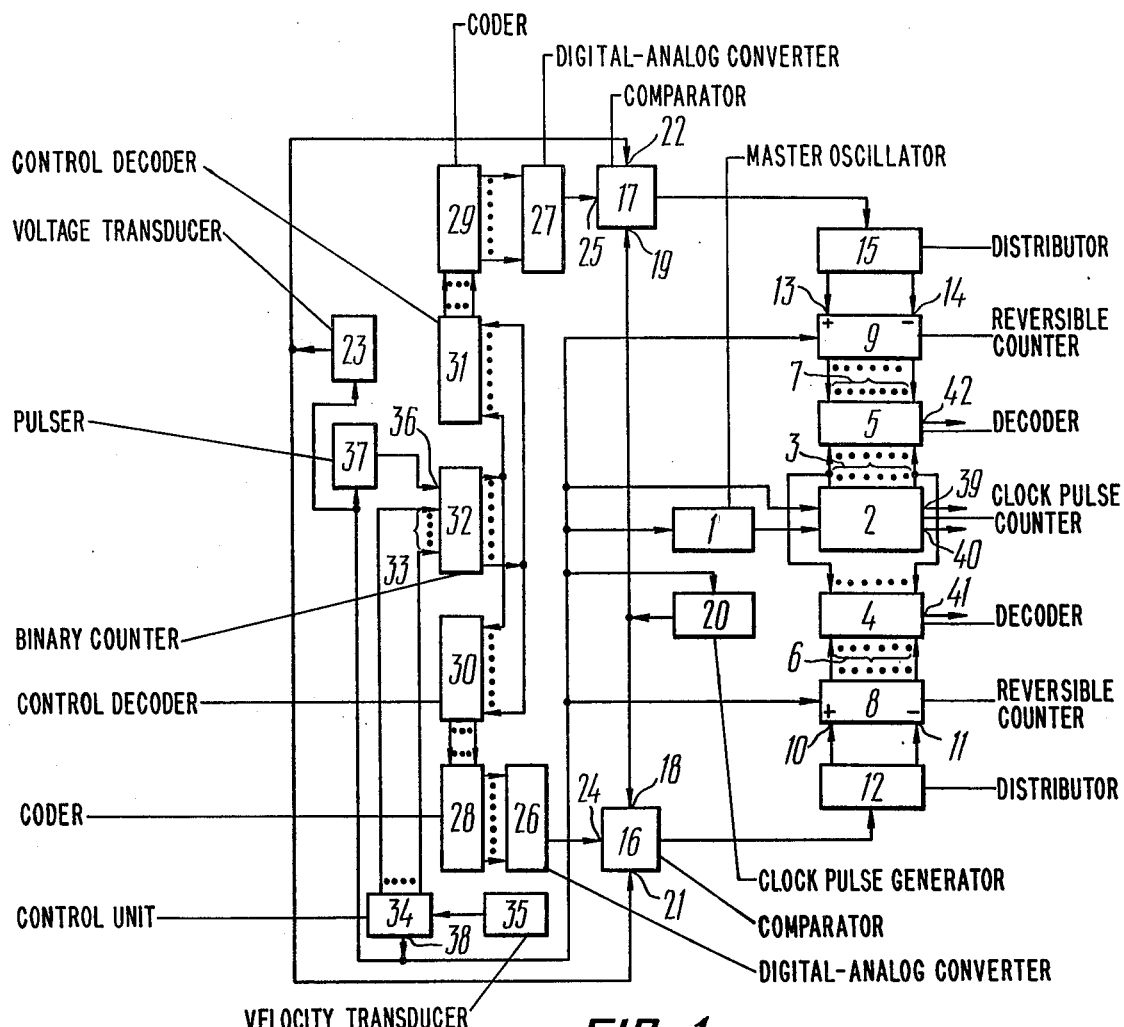
FIG. 1 is a block diagram of a digital control device for controlling thyristor-pulse d.c. regulators, in accordance with the invention.

FIG. 1 shows the proposed digital control device for controlling thyristor-pulse d.c. regulators, comprising a master oscillator 1 which is a relaxation oscillator connected to a clock pulse counter 2. The counter 2 is a binary counter whose multidigit logic output 3 is connected to multidigit logic inputs of matching decoders 4 and 5 whose function is performed by diode arrays. The number of digits of the multidigit logic input 3 is 2n, where n is the digit capacity of the counter 2. Multidigit information inputs 6 and 7 of the matching decoders 4 and 5 are connected to multidigit outputs of reversible counters 8 and 9, respectively. The counters 8 and 9 are binary reversible counters. The number of digits of the multidigit information inputs 6 and 7 is 2n, and the number of flip-flops in each of the reversible counters 8 and 9 and in the clock pulse counter 2 is n.

An add input 10 and a subtract input 11 of the reversible counter 8 are connected to outputs of a distributor 12. An add input 13 and a subtract input 14 of the feversible counter 9 are connected to outputs of a second distributor 15. Outputs of the distributors 12 and 15 are connected to outputs of comparators 16 and 17, respectively, which are constructed as ring modulators. The distributors 12 and 15 are diode isolators intended to distribute control signals between the add inputs 10 and 13 and subtract inputs 11 and 14, respectively, depending upon the polarity of signals arriving at the inputs of the distributors 12 and 15 from the comparators 16 and 17. Clock inputs 18 and 19 of the comparators 16 and 17, respectively, are connected to an output of a clock pulse generator 20 which is a relaxation oscillator. A reference signal input 21 of the comparator 16 and a reference signal input 22 of the comparator 17 are connected to an outpput of a voltage transducer 23. The output signal level of the voltage transducer 23 is proportional to the speed of the train.

A control input 24 of the comparator 16 and a control input 25 of the comparator 17 are connected to outputs of digital-analog converters 26 and 27, respectively. The comparator 16 is intended to compare voltage levels of signals arriving from the voltage transducer 23 and the digital-analog converter 26. If the absolute levels of these signals do not coincide the comparator 16 passes pulses from the clock pulse generator 20 to the input of the distributor 12. The comparator 17 serves the same purpose. Inputs of the digital-analog converters 26 and 27 are connected to outputs of coders 28 and 29, respectively. Inputs of the coders 28 and 29 are connected to outputs of control decoders 30 and 31, respectively. The coders 26 and 27 and control decoders 30 and 31 have multidigit inputs with m digits, where m=4, 5, . . . 12. The number of digits is determined by specific operating conditions.

The array of the control decoder 30 is designed to appropriately adjust the braking resistance, and the array of the control decoder 31 is designed to appropriately adjust the magnetization field attenuation factor. The inputs of the control decoders 30 and 31 are connected to outputs of a binary counter 32. As are the inputs of the control decoders 30 and 31, the output of the binary counter 32 is multidigit.

A multidigit input 33 of the binary counter 32 is connected to a multidigit control output of a control unit 34. An input of the control unit 34 is connected to an output of a velocity transducer 35 and the unit is intended, apart from other functions, to transmit a binary code signal, corresponding to the initial braking speed, to the multidigit input 33 of the binary counter 32. A single-digit input 36 of the binary counter 32 is connected to an output of a pulser 37 intended to form a train of pulses in a number proportional to the speed of the train. A reset output 38 of the control unit 34 is connected to reset inputs of the master oscillator 1, the clock pulse generator 20, the counter 2, the reversible counters 8 and 9, the pulser 37 and the voltage transducer 23.

The binary pulse counter 32 is intended to transmit a binary code, corresponding to the actual running (braking) speed, to the control decoders 30 and 31; as a result, a signal in the form of a position code is produced at one of the outputs of each of the control decoders 30 and 31, the selection of output being determined by the input binary code. The coders 28 and 29 and the digital-analog converters 26 and 27 are intended to convert the position code to a multidigit code and then to a potential signal corresponding to a desired pattern of adjusting the field attenuation factor and the braking resistance. Control outputs 39 and 40 of the clock pulse counter 2 are connected to main thyristors of two thyristor-pulse regulators (not shown). An output 41 of the matching decoder 4 and an output 42 of the matching decoder 5 are connected to switching thyristors (not shown) of the thyristor-pulse regulators.

Figure 2:
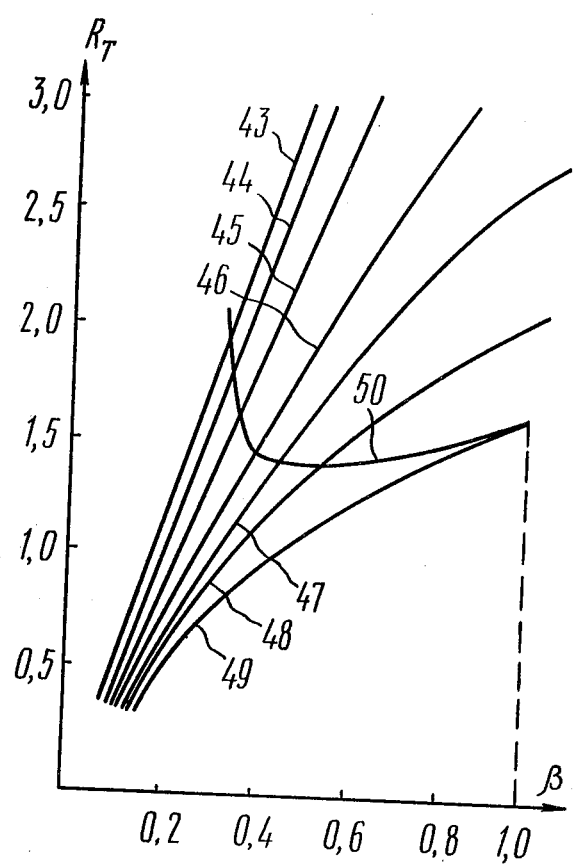
FIG. 2 is a graph showing the adjustment of the field attenuation factor versus the braking resistance at different actual speed levels and with due regard for switching and potential limitations at the commutator, the graph illustrating the present invention as applied to a Soviet subway traction motor of the DK-115G2 model.

FIG. 2 is a graph illustrating the adjustment of the field attenuation factor $\beta$ versus the brake resistance value $R_T$. Curves 43, 44, 45, 46, 47, 48 and 49 are plotted with due regard for limitations imposed by potential conditions (4) at the commutator at speeds of 100, 90, 80, 70, 65, 60 and 57.2 km per hour, respectively. Curve 50 is plotted with due regard for limitations (3) because of switching conditions.

The points of intersection between curves 43 through 49 and curve 50 indicate optimum values of $\beta$ and $R_T$ for each speed.

The proposed digital control device for controlling thyristor-pulse d.c. regulators operates as follows. Let it be assumed that the train runs at a constant speed without braking. In such a case, a potential signal is continuously sent from the output 38 (FIG. 1) of the control unit 34, which suppresses operation of the voltage transducer 23, the pulser 37, the reversible counters 8 and 9, counter 2, the master oscillator 1 and clock pulse generator 20. A blocking signal is applied to the aforesaid units of the device; as a result, no signal is produced at the outputs of the comparators 16 and 17, and no braking takes place. At the same time the velocity transducer 35 continuously sends a signal to the control unit 34; the level of this signal is proportional to the speed of the train. When braking occurs, a signal in the form of a binary code, corresponding to the initial braking speed, is applied from the multidigit control output of the control unit 34 to the multidigit input 33 of the binary counter 32.

The signal applied to the binary counter 32 resets its flip-flops, which state corresponds to the point of intersection between curves 43 and 50, this being the case at an initial braking speed of 100 km per hour. As this takes place, the blocking signal is no longer applied from the output 38 of the control unit 34 to the inputs of the master oscillator 1, the counter 2, the reversible counters 8 and 9, the voltage transducer 23 and the pulser 37. As a result, the flip-flops of the reversible counters 8 and 9 are reset (the initial states of the reversible counters 8 and 9 do not coincide); the counter 2 is set to zero, and, the pulser 37 starts sending pulses at a frequency proportional to the speed of the train to the binary counter 32. Each new pulse changes the state of the flip-flops of the binary counter 32.

From the output of the binary counter 32, signals in the form of binary code combinations are applied to the control decoders 30 and 31, i.e. to the control channels one of which adjusts the field attenuation factor $\beta$, while the other adjusts the braking resistance $R_T$. According to the logic of the arrays of the control decoders 30 and 31, which reflects the desired pattern of adjusting $R_T$ (the control decoder 30) or $\beta$ (the control decoder 31), at one of the outputs of the control decoders 30 and 31 there is produced a signal in the form of a position code, which is applied to the coders 28 and 29, respectively, to be converted by these to binary code signals. The binary code signals are applied to the digital-analog converters 26 and 27 which convert then to potential signals whose levels are proportional to the values of the binary code input signals. From the outputs of the digital-analog converters 26 and 27, the potential signals are applied to the control inputs 24 and 25, respectively, of the comparators 16 and 17. Simultaneously, clock pulses are applied from the generator 20 to the clock inputs 18 and 19 of the comparators 16 and 17. The clock pulses are produced at a preset add or subtract frequency which is in conformity with the dynamic and static characteristics of the whole system. In addition, a voltage signal proportional to the speed of the train is applied from the voltage transducer 23 to the reference signal inputs 21 and 22 of the comparators 16 and 17, respectively. If the level of voltage applied to the inputs 21 and 22 of the comparators 16 and 17, respectively, is greater than that of voltage applied to the control inputs 24 and 25, at the outputs of the comparators 16 and 17 there are produced pulses of positive polarity whose repetition frequency is equal to that of the clock pulses of the generator 20. If the level of voltage applied to the inputs 21 and 22 is lower than that of the voltage applied to the comparators 16 and 17 from the digital-analog converters 26 and 17, pulses of negative polarity are produced at the outputs of the comparators 16 and 17. If the two voltage levels are equal, no pulses are produced at the outputs of the comparators 16 and 17; and, consequently, no braking takes place.

From the comparators 16 and 17, pulses are applied to the distributors 12 and 15, respectively. Depending upon the polarity of pulses arriving from the outputs of the comparators 16 and 17, the distributors 12 and 15 send positive output pulses to the add inputs 10 and 13 of the reversible counters 8 and 9, and negative output pulses to the subtract inputs 11 and 14 of the reversible counters 8 and 9. In the former case, the reversible counters perform addition; in the latter case, they subtract. The master oscillator 1 sends clock pulses at a frequency (1) to the counter 2, whereby the state of the flip-flops of the counter 2 is reversed. From the control output 39 of the counter 2 pulses, which are fixed in time, are applied to the main thyristors of the thyristor-pulse field regulator (not shown); from the control output 40 pulses, which are fixed in time, are applied to the main thyristors of the thyristor-pulse regulator of braking resistance (not shown). The control outputs 39 and 40 are outputs of the high-order flip-flop of the counter 2. At the same time signals in the form of a binary code are applied from the multidigit logic output 3 of the counter 2 to the multidigit logic inputs of the matching decoders 4 and 5, to whose multidigit information inputs 6 and 7 there are applied signals in the form of a binary code from the reversible counters 8 and 9, respectively. As pointed out above, the initial states of the flip-flops of the reversible counters 8 and 9 are different and determine the initial duration of pulses of the thyristor-pulse field regulator and the thyristor-pulse regulator of braking resistance. In case of a coincidence of the binary code combinations applied to the multidigit logic and information inputs 6 and 7 of the matching decoders 4 and 5, pulses that are shifted in time are produced at the outputs 41 and 42, respectively, of the decoders 4 and 5, which pulses are applied to the switching thyristors of the thyristor-pulse field regulator and the thyristor-pulse regulator of braking resistance (not shown).

The duration of the output pulse of each thyristor-pulse regulator is dependent upon the intensity and repetition frequency of control signals applied to the add inputs 10 and 13 and subtract inputs 11 and 14 of the reversible counters 8 and 9. As control signals are applied to the add inputs 10 and 13, the difference in the time of arrival of time-shifted and time-fixed pulses increases; as control signals are applied to the subtract inputs 11 and 14, this difference decreases. In the former case, the duration of output pulses of the thyristor-pulse regulators increases by $\delta$; in the latter case, the difference decreases by $\delta$.

When the braking speed is reduced to 57.2 km per hour (see FIG. 2) and the limitation imposed by the switching conditions is no longer in force (this value differs with different types of motors), the thyristor-pulse field regulator stops operating, and further braking is only effected by changing the braking resistance value $R_T$. If this is the case, no more pulses are sent from the control output 42 (FIG. 1), because the array of the control decoder 31 is designed for a speed range of 100 to 57.2 km per hour, whereas the array of the control decoder 30 is designed for a speed range of 100 to 5 km per hour, which range is advantageous for effective adjustment of the braking resistance value $R_T$. Time-fixed and time-shifted pulses keep arriving from the control output 40 and output 41 until the speed is reduced to 5 km per hour, when electric braking is discontinued.

To summarize, the proposed digital control device for controlling thyristor-pulse regulators automatically controls thyristor-pulse regulators with due regard for limitations imposed by switching and potential conditions at the electromotor's commutator, and adjusts $R_T$ and $\beta$ simultaneously. The invention provides for the fullest utilization of the installed capacity of electromotors and improves the reliability of electromotors. When applied to traction motors, it helps to reduce the braking path and speed up traffic.

What is claimed is:

1. A digital control device for controlling thyristor-pulse d.c. regulators, comprising:
    a master oscillator having a reset input and an output;
    a clock pulse counter having a reset input, a control input, a multidigit logic output, and control outputs connected to main thyristors of respective regulators, said output of said master oscillator being connected to said control input of said clock pulse counter;
    first and second matching decoders, each having a multidigit logic input, a control output, and a multidigit information input, said multidigit logic output of said clock pulse counter being connected to said multidigit logic inputs of said first and second matching decoders, said control outputs of said matching decoders being connected to switching thyristors of respective regulators;
    first and second reversible counters, each having a multidigit output, add and subtract inputs, and a reset input, said multidigit information inputs of said first and second matching decoders being connected to the multidigit outputs of said first and second reversible counters, respectively;
    first and second distributors, each having first and second outputs and an input, said add inputs and said subtract inputs of said first and second reversible counters being respectively connected to the first and second outputs of said first and second distributors, respectively;
    first and second comparators, each having a clock input, a control input, a reference signal input, and an output, said inputs of said first and second distributors being connected to said outputs of said first and second comparators, respectively;

a clock pulse generator having a reset input and an output connected to said clock inputs of said comparators;

a voltage transducer having a reset input and an output connected to said reference signal inputs of said comparators;

first and second coders, each having a multidigit input and a multidigit output;

first and second digital-analog converters, each having an output and a multidigit input, said outputs of said first and second digital-analog converters being connected to said control inputs of said first and second comparators, respectively, and said multidigit inputs of said converters being connected to said multidigit outputs of said first and second coders, respectively;

first and second control decoders, each having a multidigit input and a multidigit output, said multidigit outputs of said first and second control decoders being connected to said multidigit inputs of said coders, respectively;

a binary counter having a multidigit output, a multidigit input, and a single-digit input, said multidigit inputs of said first and second control decoders being connected to said multidigit output of said binary counter;

a control unit having a multidigit output connected to said multidigit input of said binary counter, a reset output connected to said reset inputs of said voltage transducer, said reversible counters, said clock pulse counter, said master oscillator, and said clock pulse generator, and an input;

a pulser having a reset input connected to said reset output of said control unit and an output connected to said single-digit input of said binary counter; and a velocity transducer having an output connected to said input of said control unit.

* * * * *